United States Patent Office 3,146,118
Patented Aug. 25, 1964

3,146,118
ASPHALTENE-VINYL COMPOUND TELOMERS
Roy E. Thorpe, Concord, Calif., assignor to Shell Oil Company, New York, N.Y., a corporation of Delaware
No Drawing. Filed Sept. 28, 1961, Ser. No. 141,281
4 Claims. (Cl. 106—278)

This invention is concerned with improvement in the properties of asphalt compositions. More particularly, it is directed to telomers formed between asphaltenes and aliphatic vinyl compounds.

Asphalts have been divided arbitrarily with respect to their major components into two classes, namely, asphaltenes and maltenes. Their separation is normally achieved by means of solvent fractionation. The asphaltenes constitute that portion of the asphalt which is precipitated by lower aliphatic hydrocarbons, such as gasoline, isopentane and the like. Maltenes comprise the portion fully soluble in the medium employed for asphaltene precipitation and consist of saturates, aromatics and resins. Asphaltenes are normally regarded as high molecular weight polycyclic materials containing substantial proportions of heterocyclic rings wherein nitrogen, sulfur and oxygen may be present in the ring structures.

Depending upon the source and previous history of asphalts, (relative to their isolation and preparation), they may vary widely in their response to thermal influences with respect to changes in viscosity. Moreover, there is a wide variation in the quality of an asphalt relative to its ability to withstand the adverse effects of weathering, such as may occur when the material is employed as a shingle coating or for other types of roofing, paving and the like.

The change of viscosity with temperature should be kept within certain desired limits depending on the use to which the asphalt is to be put. The slope of the viscosity-temperature curve should for many purposes be kept as flat as possible so as to maintain a relatively narrow range of viscosity difference upon changes in the temperature of the asphalt composition. For example, paving asphalts must not be too fluid at the high temperatures at which they are mixed with aggregate and applied to the road, yet must not harden so much as to become brittle at low ambient temperatures. Roofing asphalts must be even less temperature susceptible, and must not slump or flow at high ambient temperatures, nor be brittle at low temperatures. Likewise, it is necessary for an asphalt to withstand the adverse effects of weathering to a substantial extent if the material is to be employed for roofing or coating puroposes. For example, it should not exhibit any abnormal tendency to form cracks or pin holes in the coating if it is to be employed for these purposes.

Dependent upon either the source of the crude from which asphalt is produced or upon refining procedures some asphalts are available in limited quantities having one or another of the properties discussed above. However, the supply of such asphalts is strictly limited and, in fact, is diminishing as the most desirable types of crudes are consumed. Furthermore, the extent to which asphalt can perform with respect to temperature response, weathering or bleeding appears to be limited and no one asphalt produced today is fully satisfactory in all of these respects.

It is an object of the present invention to provide an asphalt composition having improved compatability of the several asphalt components namely, of asphaltenes with maltenes of high saturate content or of low carbon to hydrogen ratio. It is a further object of the invention to provide an asphalt composition having improved viscosity-temperature relationships. It is a special object of this invention to provide asphalt compositions having outstanding weathering characteristics. Other objects will become apparent during the following description of the invention.

Now, in accordance with the present invention, it has been found that the weatherability, viscosity-temperature slop and other properties of asphalt compositions are surprisingly improved to an unexpected degree if the asphaltenes are subjected to reaction with aliphatic vinyl compounds, especially with esters of the acrylic acid series or with aliphatic dienes or with mixtures of said esters and dienes typified by isoprene to form telomers. Still in accordance with this invention, it has been found necessary to separate the majority of the maltenes from asphaltenes prior to the telomer reaction if the most beneficial properties are desired. If the whole asphalt is telomerized with the vinyl compound then both the maltenes and asphaltenes form telomers which become highly similar to each other and result in asphalt compositions having undesirable properties.

The vinyl compounds are preferably aliphatic esters of the acrylic acid series and more preferably esters of methacrylic acid. It is preferred that the alcohol with which the acrylic acid forms an ester is an alkanol having from about 6 to 24 carbon atoms per molecule, and still more preferably, between about 6 to 10 carbon atoms per molecule. Typical acrylate species meeting these requirements include hexyl acrylate, hexyl methacrylate, octyl acrylate, octyl methacrylate, decyl acrylate, decyl methacrylate, tetradecyl acrylate, tetradecyl methacrylate octadecyl acrylate and octadecyl methacrylate. The homologues and analogues of these species may be utilized and the vinyl compound may contain branched substituents such as the esters of the acrylic acid series in which the esterifying alcohol is a branched chain alkanol such as 2-ethylhexyl alcohol or 3,5,5-trimethylhexyl alcohol. Suitable dienes are butadiene-1,3, isoprene, 2,3-dimethyl butadiene - 1,3, and their chloro and amino-substituted analogues and homologues. Preferably the diene have between about 4 and 10 carbon atoms per molecule and of these isoprene is preferred.

The type of asphalt to which the present invention particularly applies is not critical. Hence, the well-known varieties of straight run, blown or cracked asphalts as well as mixtures thereof may be employed. Paving grade, coating grade, saturant grade and softer asphalts may be utilized in the process under consideration as well as mixtures of the same. Preferably, the asphaltene component of these asphalts as obtained by the usual refinery processes is concentrated or isolated from the other non-asphaltene components of the asphalt prior to telomerization. Asphatenes showing the most favorable response to the process comprise those of highly aromatic character containing few or short side chains. Economically, of course, it is preferable to employ an asphalt having at least 5% by weight of asphaltenes and preferably more than about 20% by weight of asphaltenes so as to have a minimum of maltene fractions and a maximum sensitive asphaltene fraction most capable of telomerization.

In order to obtain the benefits of the present invention, it is essential that sufficient vinyl monomer be reacted with the asphaltenes to incorporate between about 15 and 60% by weight of vinyl compounds in the telomer. At the same time reaction conditions or excess vinyl compound content which lead to either complete miscibility or to complete insolubilization in lower aliphatic hydrocarbons, both of which are undesirable, and should be avoided.

The term "asphaltenes" is defined in Abraham, fifth edition, of "Asphalts and Allied Substances" on pages 1165–6 as being the non-mineral constituents remaining insoluble in petroleum naphtha, thus differentiating them from the maltenes (petrolenes) which dissolve in the same medium and under the same conditions. As the test is made at room temperature (65–75° F.), this latter would constitute a further limitation. A still further limitation would comprise the proportion of petroleum naphtha employed for the purpose of causing the separation. According to the standardized method, 50 volumes of petroleum naphtha are employed, the test temperature normally being ambient (room) temperature. While this standard procedure defines the term, it will be understood that the asphaltic fraction insoluble at room temperature in any aliphatic hydrocarbon having 5–12 carbon atoms per molecule may be regarded as "asphaltene" for the present invention.

The asphalts may be introduced into the aliphatic hydrocarbon precipitant ($C_{5-12}$ alkanes, $C_{4-8}$ alkanes being preferred) by several alternative means, dependent upon their physical characteristics. For example, hard asphalts (especially cracked or blown) i.e., those having a penetration at 77° F. less than about 10 are preferably introduced by first dissolving them in a minimum amount of aromatic hydrocarbon solvent. In order to minimize the effect of the solvent upon the precipitation of the asphaltenes it is preferred that the proportion of solvent be restricted to between about 0.5 and 2 volumes for each volume of the asphaltic residue. The aromatic solvent is preferably one predominating in aromatic hydrocarbons having less than 10 carbon atoms per molecule, of which benzene and toluene are suitable members. Preferably, the aromatic solvent contains at least about 70% by weight of such aromatic hydrocarbons and more desirably contains 85% or more of such hydrocarbons. The solution may take place at room temperature or, preferably, at reflux temperature in order to hasten the process. Softer asphalts, i.e., those having penetrations greater than about 10 at 77° F., may be dispersed sufficiently for the present purpose by refluxing in the presence of a limited proportion of the precipitating aliphatic hydrocarbon, although the aromatic solvent may be used in addition to or in place of the aliphatic medium. The proportion again is preferably limited to between about 0.5 and 2 volumes of the refluxing medium for each volume of the asphalt, regardless of whether or not the refluxing medium comprises entirely aliphatic hydrocarbons having 5–12 carbon atoms per molecule or additionally contains aromatic hydrocarbons as well.

The maltene solution and the precipitated particles are separated by any suitable means including filtration, centrifuging, sedimentation, decanting or similar treatment. Following separation of the asphaltene particles they are then suspended in the alkylating agent which should be fluid at the handling temperatures and subjected to alkylation. As stated hereinbefore, of course, it is possible to alkylate full asphalts without previous fractionation to concentrate or isolate the asphaltene portion thereof.

Telomer formation between asphaltenes and the vinyl compound may be effected by heating the two reaction components at a time and temperature selected to produce telomer formation without undue homopolymerization of the vinyl compound. The procedure comprises heating asphaltenes separated as described above at a temperature between about 80–230° C. (preferably 120–150° C.) for a period of about 8–48 hours, an initiator such as a dialkyl peroxide, e.g., ditertiarybutyl peroxide, being injected periodically in an amount between about 2 and about 10% based on the weight of the vinyl monomer. Preferably the telomerizing reaction is carried out in the presence of a mutual inert solvent of low free radical activity benzene, dichlorobenzene or tertiary butyl benzene. After the reaction the product is subjected to fractional distillation to remove unused monomer, solvent and low-boiling reaction products. If desired, an asphaltene precipitation may be carried out to concentrate the telomer having the solubility properties of asphaltenes as defined hereinbefore from telomer products having the solubility properties of maltenes. It is preferred to carry this out by precipitation of the asphaltene-type product in an excess of low boiling aliphatic hydrocarbons such as 40 volumes of isopentane per volume of reaction product.

When low boiling vinyl monomers such as dienes of the isoprene type are employed for forming the telomer, it is preferable to effect telomerization in an autoclave under a pressure of between about 1000 and 5000 p.s.i. nitrogen pressure. The same type of initiator, such as dialkylperoxides, e.g., ditertiarybutyl peroxide, or diazoamino benzenes, may be employed. Temperatures between about 35 and 125° C. are preferred with the reaction period varying from about 24 hours to about 2 hours dependent primarily upon reaction temperature, the shorter times being utilized with higher reaction temperatures.

One aspect of the telomerizing reaction which has been noted is the relatively low molecular weight of the telomers so formed. In an effort to cause cross linking of molecules to occur, a minor amount (2–10% by weight based on the monomer) of vulcanizing agents such as sulfur or divinylbenzene was added to the reaction mixture comprising asphaltenes and methacrylates. Surprisingly it was found that this modification did not in fact cause cross-linking to occur except at high concentrations. However, an unexpected phenomenon did result in that the presence of the vulcanizing agent, e.g., divinyl benzene, facilitated the reaction of the monomeric acrylic ester with the asphaltenes so that larger proportions of the telomer were formed with correspondingly small proportions of homo-polymer of the methacrylate being created at the same time.

The telomerization is probably made easier because radicals containing either divinylbenzene or methacrylate probably prefer to react with the opposite monomer just as in the case of the copolymerization of styrene and methacrylate where radicals containing either monomer as the active center react about twice as readily with monomers of the opposite type.

It is preferred to restrict the proportion of monomeric acrylic ester to asphaltene ratio to between about 0.5 to 1 to 1.5 to 1 since in the presence of divinyl benzene and the like increasing proportions of the monomeric ester result in increasing product solubility. Moreover, it is necessary to maintain the divinyl benzene proportion to less than about 10% (preferably 3–6%) by weight based on the monomer since above this range (depending on monomer:asphaltene ratio) gelation of the telomer occurs and results in a product which cannot be readily dispersed to form good asphalt compositions.

One of the principal objectives of the formation of the telomer is the modification of asphaltenes by changing their polarity, size and shape in such a way as to result in products that can be blended with maltenes to durable coating-grade asphalts. A property which depends upon these factors is their compatability with saturates which may be measured by squalane tolerance. Introduction of long chain acrylates in the form of telomer products with the asphaltene is accompanied bp increase in squalane tolerance and a remarkable increase in weather-ability of asphalt constituted from the telomer products. At the same time, due to the saturate nature of the vinyl monomers being introduced, there is a marked decrease in the carbon-to-hydrogen ratio from a relatively high figure in the order of 0.91 to a figure of about 0.78-0.85 or less. The molecular weight of the telomer increases only moderately; from an average figure of about 1600 for California asphaltenes, a telomer of about 3,000–6,500 molecular weight is formed and from a Gulf Coastal asphaltene of about 3600 reaction products of 6000–7000 molecular weight were obtained.

The telomers formed according to the process of the present invention may be use as such or may be blended with maltenes or cutter stocks to form coating-grade asphaltic products. The telomers may be combined with maltenes from which the asphaltenes were originally separated or with maltenes from an entirely different source. Cutter stocks may be employed including a balance of aromatic extracts, lubricating oil raffinates and other sources of lubricating oil such as reclaimed motor oil to achieve asphalt compositions for a particular purpose within the skill of experts in the art of such compounding.

The principal achievement of the process of the present invention is to provide asphaltene-vinyl compound telomers which when compounded into an asphaltic composition result in surprisingly increased weatherability of the product. The examples which follow illustrate the process of the invention and the advantages to be gained thereby.

EXAMPLE I

As asphalt derived from California Valley crude which was low in asphaltenes and contained maltenes having a high aromatic content and a low sulfur content was studied. The asphaltenes were precipitated by isopentane and subjected to heating with various methacrylates both in the presence and in the absence of divinyl benzene. Table I, which follows, gives details of these experiments.

was present. The penetration index of the products so obtained were substantially higher than the penetration index of the control which was not reacted with the methacrylate. Moveover, the squalane tolerance, a measure of compatability (and roughly equivalent to results to be expected in weatherability), was substantially higher for the telomer derived products than for the control asphaltenes. The telomers so obtained were studied for their weathering properties by formulating coating compositions with an industrial lubricating oil raffinate and reclaimed oil. Table II indicates the results obtained. It will be seen from Table II that the control asphalt, being of relatively poor grade, could not be formulated into a coating asphalt due to its excessively low softening point. Even when the asphalt is air blown it fails in one cycle in the Altas Weather-Ometer. However, the various telomers showed a surprisingly sharp increase in weathering life as long as the telomer contained above about 15% by weight or acrylic ester monomeric units.

EXAMPLE II

As asphalt derived from a Gulf Coastal (Norco) crude which was high in asphaltenes responded even better to

*Table I.—Reaction of Acrylic Esters With PC Asphaltenes*

[130° C., 24-hour reaction time, 7% di-t-butyl peroxide, 100 ml. t-butyl benzene]

| Monomer | Monomer wt., g. | Asphaltene wt., g. | Divinylbenzene, percent w. of acrylic monomer | Unreacted monomer | | i-$C_5$ insoluble portion | | | | | | |
|---|---|---|---|---|---|---|---|---|---|---|---|---|
| | | | | Wt., g. | Percent wt. | Yield, g. | Mol. wt. | C/H ratio | N, percent w. | S, percent w. | O, percent w. | N atoms per mole |
| Lauryl methacrylate | 50.0 | 50.0 | 0 | 18.7 | 37 | 45.1 | 3,030 | 0.88 | 1.92 | | | 4.2 |
| Do | 30.0 | 30.0 | 6 | 8.1 | 24 | 33.9 | 4,290 | 0.77 | 1.41 | 0.65 | 5.44 | 4.3 |
| Do | 60.0 | 30.0 | 0 | 19.3 | 32 | 14.3 | 3,780 | 0.84 | 1.73 | 0.87 | 4.2 | 4.7 |
| Do | 60.0 | 30.0 | 3 | 17.7 | 29 | 12.5 | 3,020 | 0.82 | 1.67 | 0.84 | 4.5 | 3.6 |
| Do | 60.0 | 30.0 | a 3 | 13.5 | 22 | 15.1 | 3,285 | 0.82 | 1.58 | | | 3.7 |
| Do | 60.0 | 30.0 | 5 | 20.2 | 32 | Trace | | | | | | |
| Octyl-decyl methacrylate | 60.0 | 30.0 | 0 | 18.9 | 32 | 20.6 | 3,865 | 0.84 | 1.71 | | | 4.7 |
| Do | 60.0 | 30.0 | 3 | 22.8 | 37 | 21.6 | { 2,690 / 4,270 } | 0.83 | 1.69 | | | 3.2 |
| 2-ethylbenzyl hexyl acrylate | 59.83 | 30.03 | 4 | 14.2 | 23 | 17.1 | 4,610 | 0.70 | 0.94 | | | 3.1 |
| Control PC asphaltene | | | | | | | 1,900 | 0.91 | 2.12 | | | 2.9 |

| Monomer | Squalane tol., percent squalane | i-$C_5$ insoluble portion | | | | | i-$C_5$ soluble portion | | | | | |
|---|---|---|---|---|---|---|---|---|---|---|---|---|
| | | Blending properties | | | | | Yield, g. | Mol wt. | Ratio | N, percent w. | N atoms per mole | Squalane tol., percent squalane |
| | | Ind. raff., percent w. | Reclaimed oil, percent w. | Pen | S.P., °F. | Pl | | | | | | |
| Lauryl methacrylate | 30–35 | 40 | 32 | 16 | 220 | 4.6 | 35.1 | 1,050 | 0.60 | 0.53 | 0.4 | >60 |
| Do | ~30 | 26 | 20 | 24 | 216 | 5.1 | 12.5 | 900 | 0.64 | 0.67 | 0.4 | >60 |
| Do | 40–50 | 10 | 36 | 11 | 224 | 4.0 | 56.7 | 2,060 | 0.62 | 0.63 | 0.9 | |
| Do | 35–40 | 26 | 20 | 15 | 217 | 4.3 | 57.8 | | 0.64 | 0.68 | | |
| Do | 50–60 | 25 | 25 | 21 | 206 | 4.3 | 56.7 | 1,700 | 0.63 | 0.61 | 0.7 | >60 |
| Do | | 20 | 20 | 105 | 151 | 4.5 | 72.8 | 2,430 | 0.67 | 0.86 | 1.5 | >60 |
| Octyl-decyl methacrylate | 45–50 | 26 | 20 | 15 | 220 | 4.4 | 45.6 | 1,915 | 0.62 | 0.52 | 0.7 | >60 |
| Do | <25 | 26 | 20 | 13.5 | 226 | 4.5 | 54.0 | 1,660 | 0.64 | 0.63 | | <50 |
| 2-ethylbenzyl hexyl acrylate | 45–50 | 0 | 48 | 140 | 145 | 5.0 | 59.54 | | | | | >60 |
| Contro PC asphaltene | ~19 | { 48 / 20 } | { 0 / 28 } | { 8 / 11 } | { 180 / 172 } | { 1.0 / 0.9 } | | 750 | 0.79 | 1.30 | | | a Addition of divinyl benzene after 20 hours reaction rather than initially.

For the purpose for comparison, reaction conditions included a reaction temperature of 130° C., a reaction time of 24 hours, a telomerization initiator of 7% by weight ditertiary butyl peroxide and 100 cc. of tertiarybutyl benzene solvent. It will be seen according to the data that reaction was obtained with all of the methacrylates investigated under these conditions and that further reaction appears to have been obtained when divinyl benzene was present. The telomerization reaction. The reaction which was carried out in precisely the manner of Example I gave the results shown in Table IIA. It is clear that the reaction products with this asphalt contain less than ten methacrylate units under the reaction conditions chosen. The molecular weight of the asphaltenes has been approximately doubled and again the C/H ratio reduced. The squalane tolerance is increased to a high desirable level.

As shown in Table IIA, durability is substantially increased over the control.

modified with aromatic extract and reclaimed crank case oil to obtain a coating grade asphalt having a penetration at 77° F. of 13, a softening point of 190° F. and a penetration index of 2.4. A weatherometer test at room temperature showed a weathering life of between 29 and 46 cycles while at −10° F. it had a weathering life of between 28 and 45 cycles.

*Table IIA.—Reaction of Methacrylates With Norco Asphaltenes*

[130° C., 24-hour reaction time, 7% di-t-butyl peroxide, 100 ml. t-butyl benzene]

| Methacrylate monomer | Monomer, wt., g. | Asphaltene, wt., g. | Divinylbenzene, percent w. of acrylic monomer | Unreacted monomer | | i-C₅ insoluble portion | | | | | |
|---|---|---|---|---|---|---|---|---|---|---|---|
| | | | | Wt., g. | Percent wt. | Yield, g. | Mol wt. | C/H ratio | N, percent w. | S, percent w. | Squalane tol., percent squalane |
| Lauryl | 50.0 | 50.0 | 0 | 27.7 | 55 | 48.6 | 6,100 | 0.85 | | 7.47 | 45–50 |
| Do | 38.39 | 19.24 | 0 | 15.13 | 79 | | | | | | |
| Do | 46.5 | 46.5 | 2 | 11.2 | 24 | 36.10 | 7,000 | 0.78 | | 6.14 | 53–60 |
| None | | | | | | | 3,630 | 0.89 | 0.54 | 8.38 | 30–35 |
| 4-butylamine ethyl | 24.22 | 24.22 | 0 | 10.2 | 42 | ᵃ 33.4 | (ᵇ) | | 1.46 | 5.92 | (ᶜ) |

| Methacrylate monomer | Methacrylate content, percent w. | i-C₅ insoluble portion | | | | | | i-C₅ soluble portion | | | | |
|---|---|---|---|---|---|---|---|---|---|---|---|---|
| | | Blending Properties | | | | | | Yield, g. | Mol wt. | N, percent w. | S, percent w. | C/H ratio |
| | | Asphaltene, percent w. | Reclaimed oil, percent w. | Ind. Raff., percent w. | S.P., °F. | Pen | P.I. | | | | | |
| Lauryl | 11 | 55 | 28 | 17 | 218 | 18 | 4.7 | 22.6 | 1,450 | | 2.14 | |
| | | 52 | 28 | 20 | 205 | 26 | 4.7 | | | | | |
| Do | | | | | | | | | | | | |
| Do | 27 | 55 | (ᵈ) | 40 | 228 | 21 | 5.5 | 44.6 | 1,470 | | 5.25 | |
| | | 52 | 33 | 15 | 195 | 17 | 3.2 | | | | | |
| None | 0 | 60 | 0 | 40 | 222 | 6 | 3.0 | | 700 | | 5.10 | 0.65 |
| 4-butylamine ethyl | 20–29 | | (ᵉ) | | | | | 4.8 | | 6.28 | 0.52 | |

ᵃ Precipitated from excess CH₃OH which should be better solvent for pane polymer than isopentane.
ᵇ Not completely soluble in benzene.
ᶜ Homogeneous blender could not be made even with highly aromatic extracts.
ᵈ 5% lube oil aromatic extract.

*Table IIB.—Effect of Methylacrylation on Weathering*

[ASTM Cycle B, Atlas Weather-Ometer]

| Blend composition | | | | Pen | S.P., °F. | P.I. | ASTM, cycle to failure | | Acrylic ester in blend, percent w. |
|---|---|---|---|---|---|---|---|---|---|
| Reaction product, percent | Ind. Raffinate percent w. | Reclaimed oil, percent w. | Heavy aromatic extract | | | | Room | −10° F. | |
| Ex California Crude: | | | | | | | | | |
| 50 iso C₅ insol | 25 | 25 | 0 | 21 | 206 | 4.3 | 9 | 1–2 | 13 |
| 55 iso C₅ insol | 25 | 20 | 0 | 19 | 218 | 4.7 | 30–45 | 29–42 | 20 |
| 100 total methacrylated product | 0 | 0 | 0 | 22 | 210 | 4.6 | >210 | >210 | 62 |
| 100 isopentane sol | 0 | 0 | 0 | 22.5 | 210 | 4.7 | 136–175 | 136–175 | 57 |
| 100 isopentane sol | 0 | 0 | 0 | 13 | 262 | 6.1 | 51–90 | 50–86 | 59 |
| 52 PC-virgin | 48 | 0 | 0 | 8 | 180 | 1.0 | | 0 | None |
| 48 Blown PC asphalt | 41.6 | 10.4 | 0 | 13 | 212 | 3.7 | 8 | 1 | None |
| Ex Gulf Coastal Crude: | | | | | | | | | |
| 55 iso C₅ insol | 17 | 28 | 0 | 18 | 218 | 4.7 | | 2–4 | 5.5 |
| 55 iso C₅ insol | 40 | 0 | 5 | 21 | 228 | 5.5 | | 31–46 | 15 |
| 72 total methacrylated product | 14 | 0 | 14 | 25 | 222 | 5.5 | | 28–29 | 33 |
| 55-virgin | 15 | 30 | 0 | 11 | 217 | 3.7 | | 1 | None |

EXAMPLE III

The same asphaltenes isolated as described in Example I were treated in an autoclave with isoprene in varying amounts and under varying conditions of time and temperature as given in Table II. The products so obtained

*Table III.—Modification of Poso Coalinga Asphaltene With Isoprene*

| Initiator, percent of monomer | Isoprene, wt. g. | Asphaltenes, wt. g. | t-Butyl benzene vol., ml. | Temp., °C. | Time, hrs. | Polymeric product,ᵃ wt. g. | Yield based on monomer,ᵃ percent | i-C₅ insol., g. | I-C₅ sol., g. | Gelation |
|---|---|---|---|---|---|---|---|---|---|---|
| 0.5 | 66.6 | 33.4 | 25 | 125 | 4.5 | 34.7 | 2 | 33.3 | 1.8 | No |
| 1.0 | 66.6 | 33.4 | 25 | 125 | 12.5 | 45.4 | 18 | 35.0 | 9.5 | No |
| 3.0 | 66.6 | 33.4 | 25 | 115 | 40 | 44.0 | 16 | 37.0 | 6.5 | No |
| 3.0 | 20.0 | 40.0 | 70 | 120 | 44 | 42.7 | 13.5 | | | No |
| 3.0 | 20.0 | 40.0 | 70 | 130 | 12 | 43.0 | 15 | | | No |
| 7.0 | 20 isoprene+40 ethylhexyl acrylate | 33.4 | 60 | 130 | 12 | 45.8 | 21 | 39.0 | 6.3 | No |

ᵃ Includes only the benzene soluble portion. The major part of the product where gelation has occurred is an insoluble rubbery gel. Even in these cases the isoprene had not reacted completely.

EXAMPLE IV

In order to demonstrate the unsuitability of causing telomer formation between whole asphalts (as contrasted to isolated asphaltenes) the whole California Valley crude was treated with either 2-ethylhexyl methacrylate or with lauryl methacrylate under the same reaction conditions described in Example I. Table IV, which follows, illustrates the poor results obtained by this type of process. It is important to note the negative penetration indices obtained indicating that the reaction product has poor viscosity-temperature relationships.

*Table IV.—Reaction of Whole Asphalt With Vinyl Monomers*

[130° C., 7% di-t-butyl peroxide, 100 ml. t-butylbenzene, 24 hour reaction time]

| Monomer: Asphalt, wt. ratio | Asphalt | | Monomer | | DVB, percent of monomer | Residue, wt., g. | Monomer unreacted | | Mol. wt. | Pen | S.P., ° F. | PI |
|---|---|---|---|---|---|---|---|---|---|---|---|---|
| | Source a | Wt., g. | Kind b | Wt., g. | | | Wt., g. | Percent | | | | |
| 1:4 | PC | | EHA | 26.6 | 0 | 113.7 | 19.3 | 72 | 780 (835) 840 | 46 | 119 | −1.8 |
| 1:2.5 | PC | 106.4 | EHA | 50.0 | 0 | 142.1 | 32.9 | 66 | | 68 | 107 | −2.8 |
| 1:2 | PC | 125.0 | EHA | 32.6 | 8 | 95.4 | 5.1 | 16 | 1,135 | 120 | 105 | −1.8 |
| 1:2 | PC | 32.6 | LM | 30.0 | 12 | 86.6 | 7.0 | 23 | 970 | 168 | 103 | −1.0 |
| | PC | 60.0 | | | | | | | | 174 | 106 | −0.2 | a PC=Posco Coalinga unfinished asphalt; Norco=Norco 85/100 asphalt.
b EHA=ethylhexyl acrylate; LVI=lauryl methacrylate; EM=ethyl methacrylate; BAEM=t-butylaminoethyl methacrylate.

Any free radical source may be used. Most common among the free radical sources are organic peroxides, although other free radical sources may be used. Organic peroxides effect essentially complete vulcanization at temperatures ranging from about room temperature to 400° C. in times up to three hours or more. This definition excludes hydrogen peroxide which is not suitable for the purposes of this invention as it is not feasible to incorporate it into the elastomer. Also unsuitable are metallic peroxides, as calcium peroxide, as such compounds have decomposition temperatures that are too high. Among the organic peroxides that may be employed, mention is made of dicumyl peroxide, dialkyl peroxides as di-tert-butyl peroxide, tert-butyl cumyl peroxide, aroyl peroxides as benzoyl peroxide, lauroyl peroxide, tetraline peroxide, urea peroxide, butyryl peroxide, tert-butyl-perbenzoate and the like. Although organic peroxides as a class are suitable for the purposes of this invention not all organic peroxides or peroxygen-type compounds are equivalent because of differences in decomposition rate inherent in their structure. Among the more preferred preoxides there may be mentioned benzoyl peroxide and alkyl substituted derivatives thereof where the alkyl radical contains up to 12 carbon atoms; diacyl peroxide of the formula

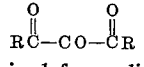

where the R's are derived from aliphatic acids as lauric acid; peroxyesters as tert-butyl perbenzoate and p-methyl perbenzoate are also among the more preferred members. Such peroxyesters have the formula

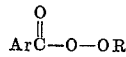

where R is derived from any tertiary alcohol particularly where one of the alkyl groups attached to the tertiary carbon atoms has more than two carbon atoms. Also suitable are other peroxygen compounds as persulfates, perborates, percarbonates, and the like. Thus, it will be seen that the choice of a particular peroxide very largely depends upon the vulcanization temperatures and such temperatures are largely a matter of choice that is made by a skilled rubber chemist after considering the composition as a whole and its subsequent utility.

Because the mechanisms of this invention require that polymer radicals be created, other sources for radical generation may be used. Other classes of free radical sources include azo compounds such as triazene derivatives of the formula R—N=N—N—R' wherein R may be a phenyl or substituted phenyl and R' may be selected from phenyl, benzyl, or alkyl radicals of 8 to 22 carbon atoms. Representative compounds of this group are 1,3-diphenyl-triazene, 1-phenyl-2-benzyl-triazene, 1-3, di-p-toly-triazene and the like. Also suitable, but more costly, is an ionizing source of radiation as a Van der Graff Accelerator. Such a source is particularly suitable for the preparation of elastomeric mono filaments.

I claim as my invention:
1. The process for the preparation of an asphalt having improved weatherability which comprises precipitating asphaltenes from an asphalt with a $C_{5-12}$ alkane, heating the asphaltenes with a $C_{6-20}$ alkyl ester of an acid selected from the group consisting of 2-methacrylic and acrylic acids at a temperature between about 120° C. and about 150° C. for 8–48 hours in the presence of an organic peroxide whereby a telomer of the asphaltenes and ester are formed, said telomer comprising 15–60% by weight of ester units, and blending the telomer with an asphalt cutter stock whereby an asphalt composition having improved weatherability is formed.

2. A process according to claim 1 wherein 1 part by weight of telomer is blended with ⅓–3 parts by weight of cutter stock, the cutter stock being a component of the group consisting of lubricating oil raffinate, lubricating oil aromatic extract, asphaltic maltenes and mixtures thereof.

3. The process for the preparation of improved asphalt compositions which comprises segregating asphaltenes from an asphalt by precipitation of said asphaltenes with a $C_{4-8}$ alkane and forming a telomer between the segregated asphaltenes and a $C_{6-20}$ alkyl ester of an acrylic acid by heating the asphaltenes and ester at a temperature between about 80 and about 230° C. for 8–48 hours in the presence of a dialkyl peroxide, said telomer comprising 15–60% by weight of said ester units.

4. A process according to claim 3 wherein 2–10% by weight, based on the ester of divinyl benzene, is present duration telomer formation, the weight ratio of ester to asphaltenes being between about 0.5 to 1 and 1.5 to 1.

References Cited in the file of this patent

UNITED STATES PATENTS

| | | |
|---|---|---|
| 2,545,963 | Mack | Mar. 20, 1951 |
| 2,671,060 | Morris | Mar. 2, 1954 |
| 2,909,441 | Pickell | Oct. 20, 1959 |

FOREIGN PATENTS

| | | |
|---|---|---|
| 581,368 | Great Britain | Oct. 10, 1946 |

OTHER REFERENCES

Abraham: "Asphalts and Allied Substances," 5th ed., Van Nostrand Co., Inc., N.Y., 1962; Vol. I, page 63.

The Condensed Chemical Dictionary, 6th ed., Reinhold Publishing Company, New York, pages 114 and 901.